(12) United States Patent
Osborne et al.

(10) Patent No.: US 10,318,632 B2
(45) Date of Patent: Jun. 11, 2019

(54) MULTI-LINGUAL DATA INPUT SYSTEM (71) Applicant: Microsoft Technology Licensing, LLC, Redmond, WA (US)

(72) Inventors: Joseph Osborne, London (GB); Abigail Bunyan, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 15/458,838

(22) Filed: Mar. 14, 2017

(65) Prior Publication Data

US 2018/0267952 A1 Sep. 20, 2018

(51) Int. Cl.
*G06F 17/27* (2006.01)
*G06F 17/21* (2006.01)

(52) U.S. Cl.
CPC ............ *G06F 17/276* (2013.01); *G06F 17/21* (2013.01); *G06F 17/273* (2013.01); *G06F 17/2785* (2013.01)

(58) Field of Classification Search
CPC .... G06F 17/289; G06F 17/275; G06F 17/276; G06F 3/04886
USPC .......................................................... 704/9
See application file for complete search history.

(56) References Cited

U.S. PATENT DOCUMENTS

| | | | |
|---|---|---|---|
| 7,302,640 B2 | 11/2007 | Lee et al. | |
| 8,374,846 B2 | 2/2013 | Assadollahi | |
| 8,374,850 B2 | 2/2013 | Assadollahi | |
| 8,713,432 B2 | 4/2014 | Assadollahi | |
| 8,938,688 B2 | 1/2015 | Bradford et al. | |
| 8,976,115 B2 | 3/2015 | Longe et al. | |
| 9,092,425 B2 | 7/2015 | Mirowski et al. | |
| 9,190,055 B1* | 11/2015 | Kiss ........................ | G10L 15/07 |
| 9,412,365 B2 | 8/2016 | Biadsy et al. | |
| 10,180,930 B2* | 1/2019 | Lai .......................... | H04L 67/02 |
| 2002/0087311 A1* | 7/2002 | Leung Lee ............ | G06Q 30/06 |
| | | | 704/251 |
| 2002/0111806 A1 | 8/2002 | Franz et al. | |
| 2005/0125218 A1* | 6/2005 | Rajput ................ | G06F 17/2765 |
| | | | 704/8 |
| 2005/0198023 A1* | 9/2005 | James ................... | G06F 3/0236 |

(Continued)

OTHER PUBLICATIONS

Silfverberg, et al., "Predicting Text Entry Speed on Mobile Phones", In Proceedings of the SIGCHI conference on Human Factors in Computing Systems, Apr. 1, 2000, 8 pages.

(Continued)

*Primary Examiner* — Shaun Roberts
(74) *Attorney, Agent, or Firm* — Schwegman Lundberg & Woessner, P.A.

(57) ABSTRACT

A data input system is described which has a user interface which receives one or more context text items in a sequence of text items input by a user. A processor of the data input system uses a plurality of language models to predict, from each language model, a next item in the sequence of text items. The processor uses a dynamic model which is bespoke to the user as a result of learning text items which the user has previously used, to predict a next item in the sequence of text items. The processor weights the predicted next item from the dynamic model using at least per term weights, each per term weight representing a likelihood of an associated term of the dynamic model given one of the language models.

20 Claims, 5 Drawing Sheets

(56) References Cited

U.S. PATENT DOCUMENTS

| | | |
|---|---|---|
| 2008/0154600 A1 | 6/2008 | Tian et al. |
| 2014/0267045 A1* | 9/2014 | Grieves ............... G06F 17/2735 345/168 |
| 2014/0278349 A1* | 9/2014 | Grieves ............... G06F 17/2735 704/8 |
| 2015/0317069 A1* | 11/2015 | Clements ............. G06F 3/0237 715/773 |
| 2016/0026258 A1 | 1/2016 | Ou et al. |
| 2016/0328377 A1 | 11/2016 | Spencer et al. |
| 2017/0357632 A1* | 12/2017 | Pagallo ................ G06F 17/276 |
| 2017/0357640 A1* | 12/2017 | Bellegarda ............ G06F 17/289 |

OTHER PUBLICATIONS

"International Search Report and Written Opinion Issued in PCT Application No. PCT/US2018/021240", dated Jun. 26, 2018, 12 Pages.

\* cited by examiner

MULTI-LINGUAL DATA INPUT SYSTEM

BACKGROUND

Data input systems such as predictive virtual keyboards, predictive speech input systems and others are increasingly used to enter information into electronic devices and computing systems. Where electronic devices have a small form factor it can be burdensome for users to manually type in data using virtual keyboards. Where speech input is difficult due to background environment noise and/or the need to avoid disturbing others it is burdensome to speak individual data items for input.

Data input systems which use predictive technology to predict candidate next data input items are increasingly available. These include predictive virtual keyboards and other data input systems which offer candidate next data items, such as words, phrases, sentences, emoji, images, stickers, emoticons and others for the user to select. The user can then give a single input action such as a speech input, touch input or other modality of input to input the candidate data item.

From the point of view of multi-lingual users, existing predictive data input systems are often frustrating to use. A user who enters an English word and then tries to input a French word in the same sentence often finds the French word autocorrected to an English word and/or finds that candidates which are offered for input are all English words. This increases burden on the end user who then has to type in the complete French word letter by letter. In the case that phrases or sentences are being predicted a user would have to speak the whole French sentence rather than simply speak one command word in order to select a candidate offering of that French sentence.

The embodiments described below are not limited to implementations which solve any or all of the disadvantages of known data input systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A data input system is described which has a user interface which receives one or more context text items in a sequence of text items input by a user. A processor of the data input system uses a plurality of language models to predict, from each language model, a next item in the sequence of text items. The processor uses a dynamic model which is bespoke to the user as a result of learning text items which the user has previously used, to predict a next item in the sequence of text items. The processor weights the predicted next item from the dynamic model using at least per term weights, each per term weight representing a likelihood of an associated term of the dynamic model given one of the language models.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Although the present examples are described and illustrated herein as being implemented in a virtual keyboard text entry system on a smart phone or smart watch, the system described is provided as an example and not a limitation. As those skilled in the art will appreciate, the present examples are suitable for application in a variety of different types of data input systems including those using speech to input data.

Multi-lingual users often mix languages in a single sentence. However, this is difficult for existing predictive data input systems to deal with and results in candidates being offered for data input which are not what the user intended. Where the predictions are used for correction, the user often finds that words he or she types in a different language from a "main" language of the predictive data input system are autocorrected to the main language and this is unhelpful and frustrating for the user.

The present technology recognizes that many of the problems of existing multi-lingual data input systems stem from the relatively static and independent nature of individual language models used to compute predictions. For example, a data input system with two language models, one for English and one for French, is typically unable to made good candidate predictions in the case that a user wants to enter both French and English words in the same passage of text. Predictions are computed from the English language model and predictions are computed from the French language model. The predictions are typically weighted in the light of context. One or more of the weighted predictions are then selected for offering as candidates for data input, or for autocorrection or other purposes. However, if the context is computed as being biased towards English, then it is difficult for French words to be offered as candidates. It is recognized herein that in the case of multi-lingual data input systems the context is computed in a relatively static manner which is dependent on the language models themselves. Previous approaches have no good way to learn about the linguistic context in which a user chooses to use words of different languages.

Existing multi-lingual data input systems using a plurality of language models suffer further problems in the case that a user deletes or deselects one of the language models after some time. Suppose a multi-lingual user has been using a Spanish and an English language model as part of his or her predictive data input system. A corpus of Spanish and English words have been learnt by the data input system as words typically used by this individual and this corpus is stored in a dynamic model which is bespoke to the user. Suppose the user now deselects the Spanish language model. The user expects to receive no Spanish words as candidates for data input and to have no autocorrection to Spanish words. However, the user continues to receive Spanish words as candidates or as autocorrection as Spanish words are present in the dynamic model. Where the data input system actively promotes infrequent words from the dynamic model, it is then found that Spanish words are increasingly offered as candidates or used for correction, even though the user has tried to stop using Spanish.

The present technology uses per term weights to enable linguistic context in which a user chooses to use text items to be taken into account when making predictions. A text item is a word, phrase, sentence, passage, emoji, emoticon, sticker, image, or other piece of data intended for use as part of a piece of text. A term is the same as a text item. A per term weight represents the likelihood of the term given a particular language model; it can be thought of as the likelihood that the term belongs to the language of the language model.

The per term weights are stored in association with a dynamic model. A dynamic model is a predictive language model which is bespoke to at least one user. A dynamic language model learns text items used by the user, for example, by observing email messages of the user, documents authored by the user, data input by the user using the data input system and in other ways.

For example, there is one or more per term weight for each term of the dynamic language model (here "term" is the same as "text item"). Initially the per term weights are set to initial values as described in more detail below, and over time the per term weights are learnt so these more accurately express the likelihood of the term given a particular language model. Suppose the term is "chica" then, in the case of a data input system with three language models (English, French, Spanish) there may be three per term weights for "chica" one expressing how likely "chica" is to occur given the English language model, one expressing how likely "chica" is to occur given the French language model and one expressing how likely "chica" is to occur given the Spanish language model. Thus the per term weights are learnt in an iterative process by observing user behavior and the associated linguistic context. This is described in more detail below with reference to FIGS. 3 and 4.

Figure 1:
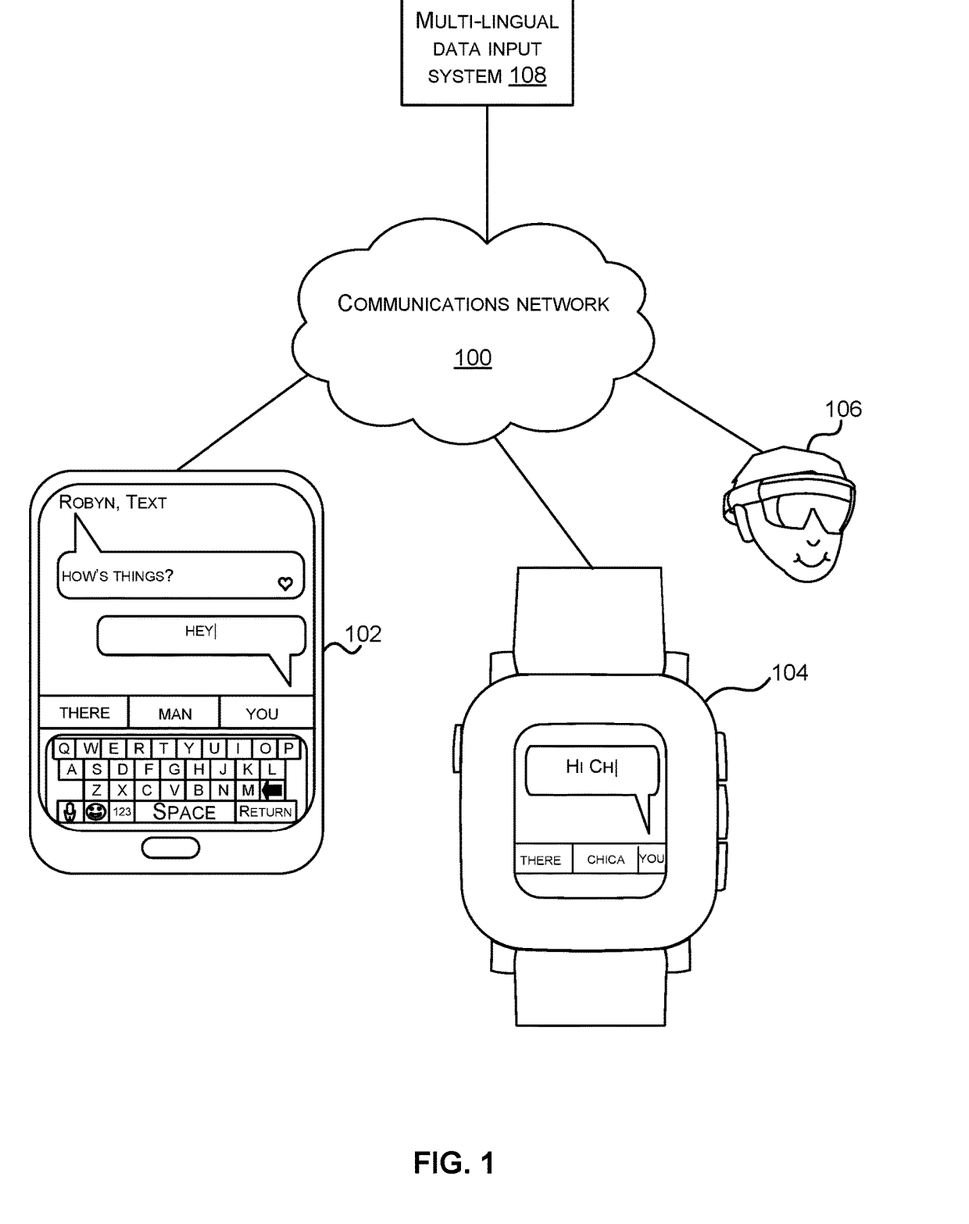
FIG. 1 is a schematic diagram of a multi-lingual data input system used with a variety of electronic devices.

FIG. 1 is a schematic diagram of a smart phone 102 with a virtual keyboard, a smart watch 104 with a virtual keyboard and an augmented reality head-worn computing device 106. The augmented reality head-worn computing device 106 displays a virtual keyboard to the user and the user is able to select keys of the virtual keyboard using eye movements, finger pointing, speech commands or in other ways.

The smart phone 102, smart watch 104 and augmented reality head worn-device 106 are examples of electronic devices where virtual keyboards are used to input data although other electronic devices may be used with the technology described herein. Each of the electronic devices 102, 104, 106 either comprises a multi-lingual data input system 108 or has access to a multi-lingual data input system 108 via a communications network 100. The multi-lingual data input system comprises predictive technology and in some examples the data input system is integral with a virtual keyboard. However, this is not essential as the multi-lingual data input system uses any technology which predicts candidate text items and enables a user to select those for data input to an electronic device. The functionality of the multi-lingual data input system 108 is described in more detail below and it may be shared between an electronic device 102, 104, 106 and a multi-lingual data input system 108 in the cloud in some examples. The multi-lingual data input system is implemented using one or more of: software, hardware, firmware.

Using the multi-lingual data input system the user is able to input text comprising characters, words, emoji, emoticons, pictograms and other text items. The multi-lingual data input system predicts at least one text item in the sequence, such as the current item and zero, one or more candidate next items in a sequence of text items input by the user and presents these to the user for input to the electronic device. For example, the smart phone 102 of FIG. 1 shows a message being typed in by a user in reply to a message from Robyn which says "How's things?". The user has typed in "Hey" and is beginning to type in another word. The data input system has computed candidate words for input to the electronic device which are displayed on the virtual keyboard and which are "there", "man", "you". Suppose the user is fluent in Spanish and English. The user intends the next word to be "chica" and is frustrated that the candidates only offer English words since the context "hey" is biased to English. At this point, the user is forced to manually type in the individual letters of the word "chica" as no candidate for "chica" is offered. The multi-lingual data input system 108 of the present technology is able to learn per term weights for "chica" which learn that an English context such as "hey" is likely for the term "chica" in the case of this individual user. Suppose the present technology has learnt per term weights in this way and the same user now operates his or her smart watch as indicated in FIG. 1.

The user enters "Hi ch" to the smart watch 104 using touch input, spoken input, eye movements, finger pointing or in other ways. The multi-lingual data input system 108 predicts candidate next items and offers the candidates "there", "chica" and "you". Even though the context text item in this case is an English word "Hi" the per term weight for "chica" which has been learnt in the situation described above with reference to the smart phone 102, is able to promote the prediction "chica" so that it is offered as a candidate.

In the case that the data input system 108 is in the cloud, the electronic device such as the smart phone 102 sends the text input by the user such as "Hey" to the data input system 108 in the cloud. The data input system 108 computes the candidate words using a plurality of language models, a dynamic model and per term weights, and sends these to the electronic device. Other variations on this scheme are possible where various different parts of the data input system functionality is located at the electronic device itself.

Alternatively, or in addition, the functionality of the multi-lingual data input system 108 described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
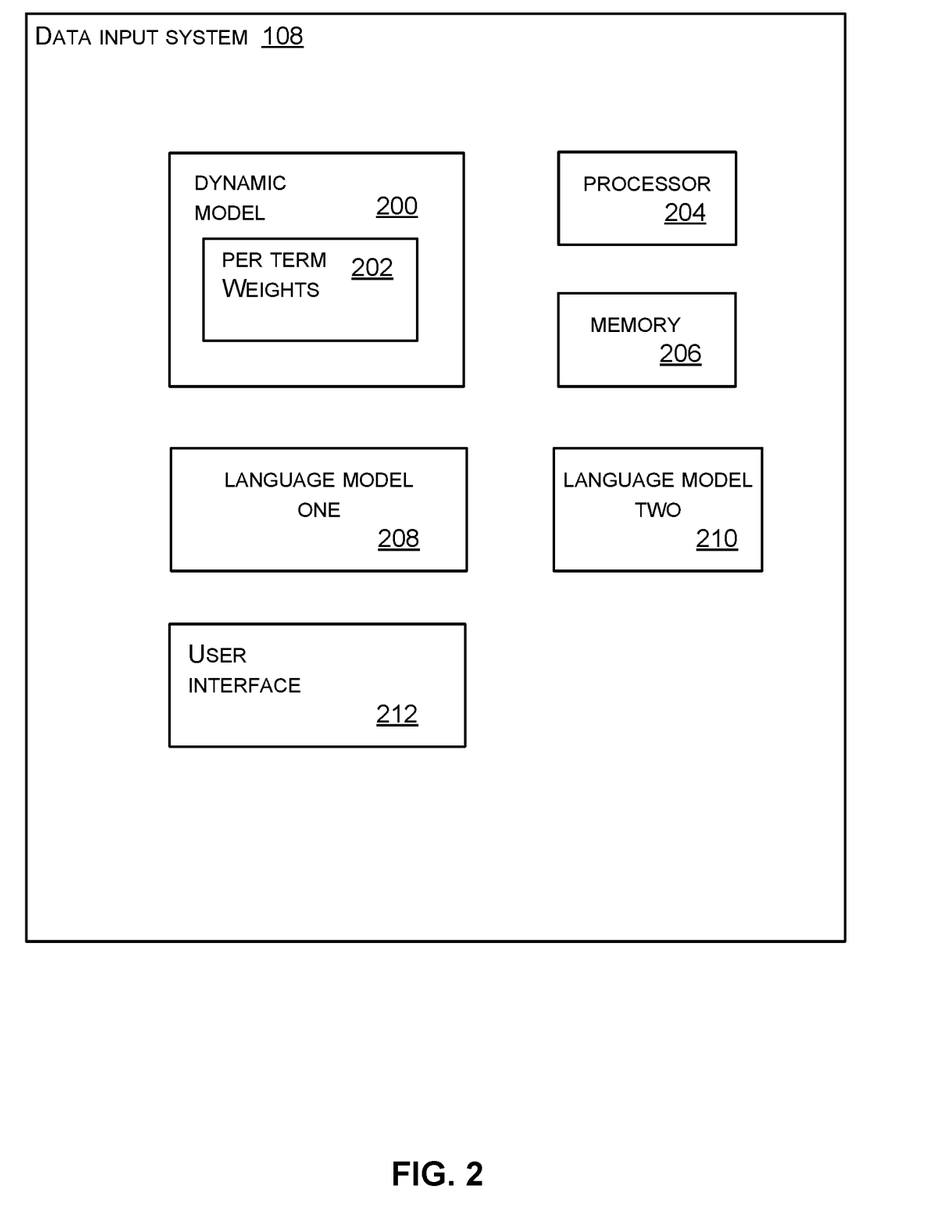
FIG. 2 is a schematic diagram of the multi-lingual data input system of FIG. 1 in more detail.

FIG. 2 shows the data input system 108 in more detail. The data input system has one or more processors 204, a memory 206, and a plurality of different language models 210, 208. Each language model is a predictive model which is able to predict text items in a given language such as English, French, written English, spoken English, scientific English, dialect English or others. Any type of language model is used such as an n-gram model, a neural network language model, a dictionary, or others.

The data input system 108 has at least one dynamic model 200 where a dynamic model is bespoke or unique to a particular user as explained above. The data input system 108 has dynamic models for many different individual users in some cases and is able to select which dynamic model to use in a particular situation according to identifiers of the individual users. Each dynamic model has associated per term weights 202 as mentioned above which, in some cases, are stored in the dynamic model. However, this is not essential as the dynamic weights are storable at any location accessible to the dynamic model including at a remote entity or distributed over many entities.

In some cases the data input system has a user interface 212 for example, to display a virtual keyboard and receive user input selecting offered candidates. However, in some cases the user interface is omitted where the data input system receives a message comprising the user input which has been made at another entity.

Figure 3:
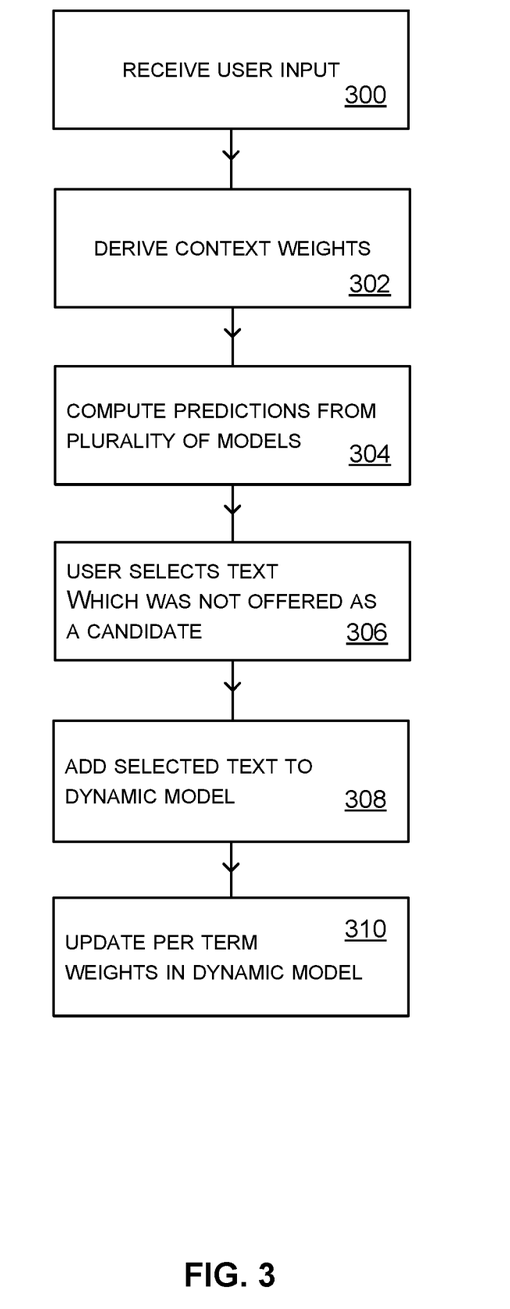
FIG. 3 is a flow diagram of a method of operation at the multi-lingual data input system of FIG. 2.

FIG. 3 is a flow diagram of a method of operation of the data input system 108 in a case illustrated with respect to the smart phone of FIG. 1. In this example the data input system comprises an English language model, a Spanish language model and a dynamic language model stored at the smart phone 102. The data input system receives user input 300. For example, a user interface at the smart phone receives touch input on the soft keyboard and the word "Hey" is entered.

The data input system 108 derives 302 context weights using the context text item "Hey" and any available metadata. Context text is any text which the user has previously entered or which is associated with the data entry. Metadata is data describing the context text, such as data about a geographical location of a recipient to whom a message which is currently being composed by the user is to be sent. In the situation of FIG. 1 for the smart phone 102 a text message is being composed in reply to a message from Robyn and so metadata about the geographical location, or preferred language of Robyn is used. In the case of a mixed language sentence, context words which have already been entered typically do not indicate the language of the next text item to be input as in the case of FIG. 1 for the smart phone.

The data input system uses the context text to derive the context weights in some cases by examining if the context text items are present in the individual language models. In the smart phone example of FIG. 1 the context text is "hey" and is found in the English language model but not the Spanish language model. The metadata about Robyn indicates a bias to English.

In some cases the data input system derives the context weights by also examining if the context text items are present in the dynamic language model. In the smart phone example of FIG. 1 "hey" is not found in the dynamic language model.

Therefore in the smart phone example of FIG. 1 the derived context weights are high for English and low for Spanish because the context text item is present in the English language model but not the Spanish model or the dynamic model and the metadata indicates a bias to English.

The data input system 108 computes 304 predictions from the plurality of language models given the context text "Hey". For example, it computes predicted next words or phrases from the English language model and from the Spanish language model and from the dynamic language model. The highest ranking predictions from the English language model are (in an example) "there", "man", "you". The highest ranking predictions from the Spanish language model are (in an example) "yo", "que". The highest ranking predictions from the dynamic language model are (in an example) "there", "you". The context weights are used to weight the relevant predictions. In the present example, the context weights reduce the rank or score of the predictions from the Spanish language model and boost the ranks or scores of the predictions from the English language model. In addition, per term weights are used to boost or dampen predictions from the dynamic model. The dynamic model predicted "there" and "you" and suppose these predictions are unaffected by the per term weights since the per term weights are initialized to be equal for each language model at this point given that "hey there" and "hey you" have not previously been learnt by the dynamic language model for this user.

The highest ranking/scoring predictions are selected and offered as candidates for data input and in the example of FIG. 1 for the smart phone, the candidates are "there", "man", and "you" since these were boosted by the context weights.

The user intends to input "chica" which is not one of the candidates offered. The user proceeds to enter "chica" letter by letter and in so doing selects 306 text which was not offered as a candidate. The selected text "chica" is observed and added 308 in the dynamic model which learns "chica" and "hey chica" as a result. Per term weights for "chica" and "hey chica" are created. The per term weights are set to initial values as described in more detail below. The per term weights are then updated 310 to become more similar to the context weights derived at operation 302. In this way the data input system learns the linguistic context of terms in the dynamic model and is better able to deal with multi-lingual data input.

Figure 4:
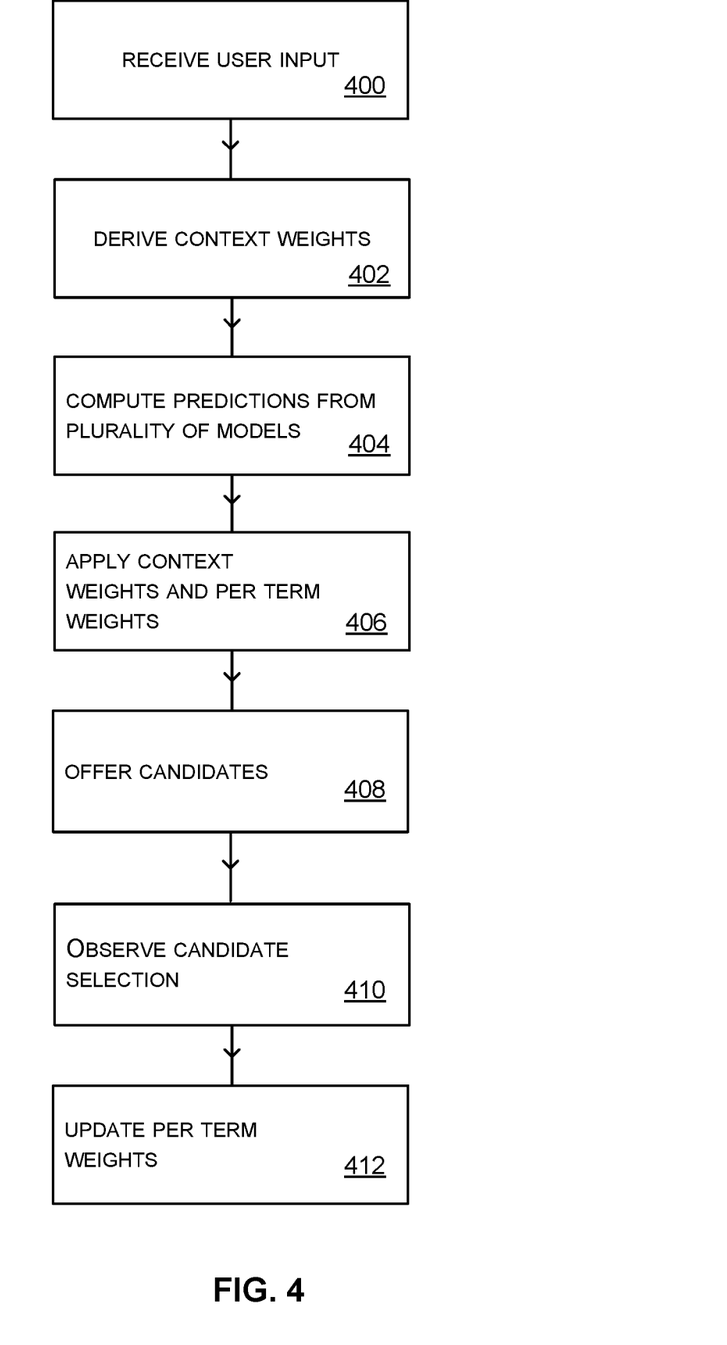
FIG. 4 is a flow diagram of another method of operation at the multi-lingual data input system of FIG. 2.

Suppose the user now begins to use his or her smart watch 104. The dynamic model, English language model and Spanish model are available locally at the smart watch or by communication with cloud based data input system 108. With reference to FIG. 4, user input is received 400. For example, the user enters "Hi ch" at the smart watch using spoken input or touch input. The data input system derives the context weights at run time, as described above with reference to FIG. 3. In this case the context weights are high for English and low for Spanish since "hi" is found in the English language model but not the Spanish language model or the dynamic language model.

Using the context text items "hi ch" the data input system 108 computes 404 predicted next text items using each of the language models and the dynamic language model. Suppose the English language model computes the predictions "there", "man", "you" and the Spanish language model computes the predictions "yo", "que" and, with very low probability "chica". Suppose the dynamic language model computes the prediction "chica" since chica has recently been learnt and new words are promoted. The context weights and the per term weights are applied 406 to the computed predictions. The context weights boost the predictions from the English language model and dampen the predictions from the Spanish language model, including the prediction for "chica" from the Spanish model. The prediction of "chica" from the dynamic model however is boosted using the associated per term language weight, since the per term language weight for "chica" in the dynamic language model has learnt (from the situation of FIG. 3) that the linguistic context for "chica" with this user includes English context. Thus, after application of the context and per term weights, the prediction "chica" from the dynamic language model is boosted to be on a par with the predictions from the English language model. Therefore the candidates "there", "chica" and "you" are offered 408 as indicated in FIG. 1 for the smart phone 104.

Suppose the user selects the candidate "chica" by making a spoken command or touch input, or other input. The data input system observes 410 the candidate selection and updates the per term weights in the dynamic model for "chica" to move those towards the context weights.

An example is now described in which the user enters a new text item, which is a text item that does not currently exist in the dynamic model or in the other language models, perhaps because the text item is a proper noun such as "Sarah", or a text item which is new to the language as a whole such as a new emoji or a new hashtag.

In this example the data input system comprises an English language model, a Spanish language model and a dynamic language model. With reference to FIG. 3, the data input system receives user input 300. For example, a user interface at the smart phone receives touch input on the soft keyboard and the word "Hey" is entered.

The data input system 108 derives 302 context weights using the context text item "Hey" and any available metadata as described above. In the smart phone example of FIG. 1 the derived context weights are high for English and low for Spanish because the context text item is present in the English language model but not the Spanish model or the dynamic model and the metadata indicates a bias to English.

The data input system 108 computes 304 predictions from the plurality of language models given the context text "Hey". For example, it computes predicted next words or phrases from the English language model and from the Spanish language model and from the dynamic language model. The highest ranking predictions from the English language model are (in an example) "there", "man", "you". The highest ranking predictions from the Spanish language model are (in an example) "yo", "que". The highest ranking predictions from the dynamic language model are (in an example) "there", "you". Note that "Sarah" cannot be predicted at this point since it is a new word not currently in any of the language models. The context weights are used to weight the relevant predictions. In the present example, the context weights reduce the rank or score of the predictions from the Spanish language model and boost the ranks or scores of the predictions from the English language model. In addition, per term weights are used to boost or dampen predictions from the dynamic model. The dynamic model predicted "there" and "you" and suppose these predictions are unaffected by the per term weights since the per term weights are initialized to be equal for each language model at this point given that "hey there" and "hey you" have not previously been learnt by the dynamic language model for this user.

The highest ranking/scoring predictions are selected and offered as candidates for data input and in the example of FIG. 1 for the smart phone, the candidates are "there", "man", and "you" since these were boosted by the context weights.

The user intends to input "Sarah" which is not one of the candidates offered and which is a proper noun that does not currently exist in the dynamic language model or in the other language models. The user proceeds to enter "Sarah" letter by letter and in so doing selects 306 text which was not offered as a candidate. The selected text "Sarah" is observed and added 308 in the dynamic model which learns "Sarah" and "hey Sarah" as a result. Per term weights for "Sarah" and "hey Sarah" are created. The per term weights are set to initial values as described in more detail below. The per term weights are then updated 310 to become more similar to the context weights derived at operation 302. In this way the data input system learns the linguistic context of terms in the dynamic model, which in this case is an English language model context.

Suppose the user now begins to use his or her smart watch 104. The dynamic model, English language model and Spanish model are available locally at the smart watch or by communication with cloud based data input system 108. With reference to FIG. 4, user input is received 400. For example, the user enters "Hi S" at the smart watch using spoken input or touch input. The data input system derives the context weights at run time, as described above with reference to FIG. 3. In this case the context weights are high for English and low for Spanish since "hi" is found in the English language model but not the Spanish language model or the dynamic language model.

Using the context text items "hi S" the data input system 108 computes 404 predicted next text items using each of the language models and the dynamic language model. Suppose the English language model computes the predictions "there" and "Sir" and the Spanish language model computes the predictions "yo" and "que". Suppose the dynamic language model computes the prediction "Sarah" since "Sarah" has recently been learnt and new words are promoted. The context weights and the per term weights are applied 406 to the computed predictions. The context weights boost the predictions from the English language model and dampen the predictions from the Spanish language model. The prediction of "Sarah" from the dynamic model is therefore boosted using the associated per term language weight, since the per term language weight for "Sarah" in the dynamic language model has learnt that the linguistic context for "Sarah" with this user includes English context. Thus, after application of the context and per term weights, the prediction "Sarah" from the dynamic language model is boosted to be on a par with the predictions from the English language model. Therefore the candidates "there", "Sarah" and "Sir" are offered 408.

Suppose the user selects the candidate "Sarah" by making a spoken command or touch input, or other input. The data input system observes 410 the candidate selection and updates the per term weights in the dynamic model for "Sarah" to move those towards the context weights.

As mentioned above, problems can arise when a user deletes or deselects one of the language models used by the data input system 108. For example, where a multi-lingual user has been using a Spanish and an English language model as part of his or her predictive data input system the dynamic model, which is bespoke to the user, has learnt many Spanish as well as English words. Suppose the user now deselects the Spanish language model. The user expects to receive no Spanish words as candidates for data input and to have no autocorrection to Spanish words. However, the user continues to receive Spanish words as candidates or as autocorrection as Spanish words are present in the dynamic model. The present technology reduces this problem since the per term weights which have been learnt take into account that the Spanish terms in the dynamic model are not suitable in English contexts, and so reduce the likelihood of these terms being offered as candidates or used for autocorrection.

More detail about the process for initializing the per term weights is now given. In some cases the per term weights are initialized randomly by allocating numerical values between zero and one using a pseudo random generator. In some cases the per term weights are initialized to give equal likelihood of any of the language models applying. This has been found empirically to be particularly effective and gives good quality results. In the case of three language models, the per term weights are 0.33 for each language model. In some cases the per term weights are initialized using the context weights. For example, in the case of FIG. 3 the initial per term weight for "chica" is low for Spanish and high for English.

More detail about the process of updating the per term weights is now given. The update process comprises interpolating the current per term weight value towards the current context weight value in some cases. The interpolation is achieved in any suitable way. In some examples the update is done by representing the per term weights as a probability of a term given a language model, and the context weights as a probability of the context text items given a language model, and using a probabilistic update rule. The probabilistic update rule is based on Bayes rule in some examples.

An example in which the probabilistic update rule is based on Bayes rule is now given. Each per term weight comprises stored statistics such as a mean and variance of a Gaussian probability distribution representing belief about the probability of a particular text item given a particular language model. The probability distribution is denoted $P(w|L)$ where L denotes a language model and w denotes a text item such as a word, emoji, hashtag, or other text item. The context weights may also be represented using statistics such as a mean and variance of a Gaussian probability distribution $P(L|C)$ representing belief about the probability of a particular language model L applying given particular context items C.

Using Bayes rule an update to the statistics for a particular per term weight are computed using the following expression:

$$P(w|L) = \frac{P(L|w)P(w)}{P(L)}$$

Which is expressed in words as the updated probability of the text item w given the language model L, is equal to the probability of the language model itself being used to predict the particular text item w, times the probability of the next text item being text item w, divided by the probability of the language model itself being used.

The probability of a language model $P(L)$ applying to the predicted next text item, may be determined empirically by observing frequency of use of different ones of the language models by the user or by a population of users. The probability of a text item $P(w)$ may be determined empirically by observing frequency of use of the text item in a population of users, or for the particular user concerned. The probability of a particular language model given a text item $P(L|w)$ may be approximated by the appropriate context weight which has been computed at run time as described above.

Using the above update rule the mean and variance of the probability distributions of the per term weights are updated as user input is observed selecting offered candidate items or inputting text items as described above.

In some examples the data input system updates the per term weights by representing a per term weight as a vector in a vector space and representing a context weight as a vector in the vector space and interpolating the per term vector towards the context weight vector.

Figure 5:
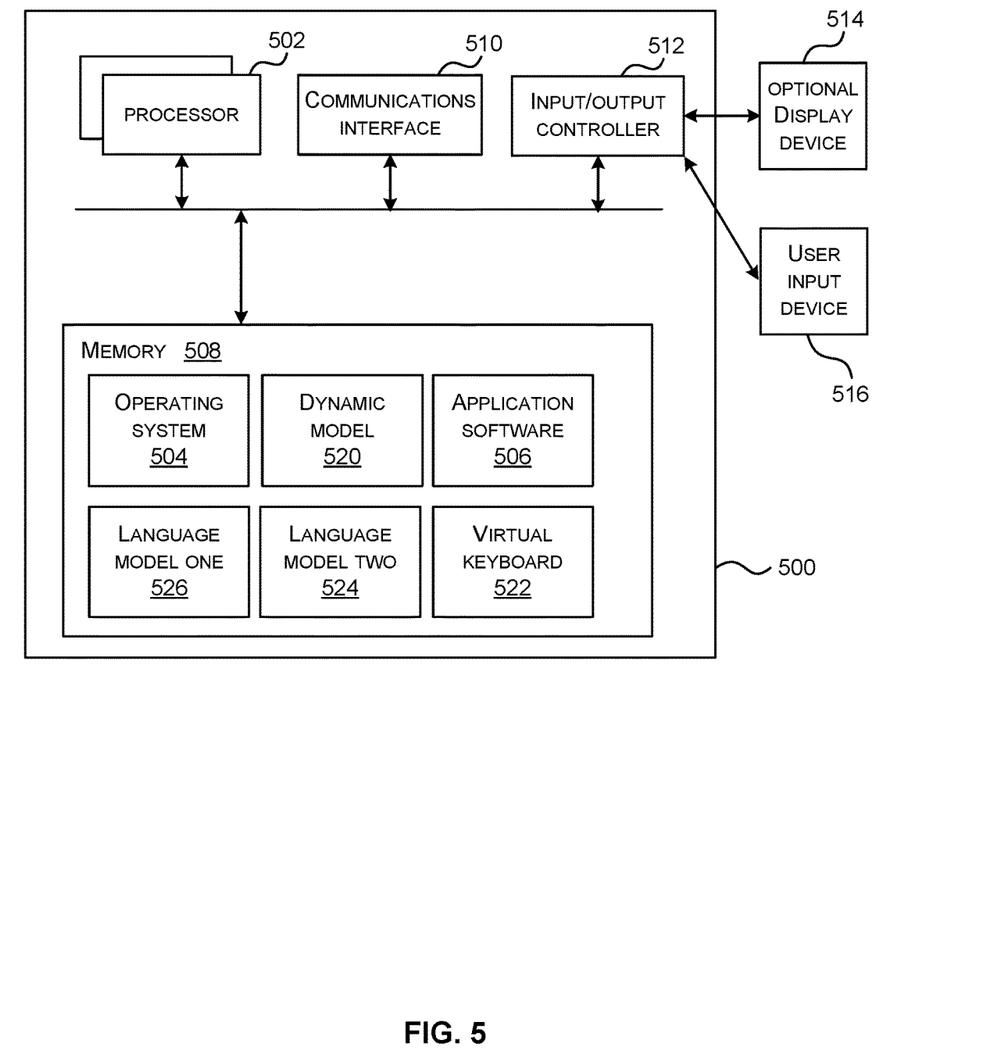
FIG. 5 illustrates an exemplary computing-based device in which embodiments of a multi-lingual data input system are implemented.

FIG. 5 illustrates various components of an exemplary computing-based device 500 which are implemented as any form of a computing and/or electronic device, and in which embodiments of a multi-lingual data entry system 108 are implemented in some examples.

Computing-based device 500 comprises one or more processors 502 which are microprocessors, controllers or any other suitable type of processors for processing computer executable instructions to control the operation of the device in order to facilitate multi-lingual data entry to the computing-based device 500. In some examples, for example where a system on a chip architecture is used, the processors 502 include one or more fixed function blocks (also referred to as accelerators) which implement a part of the method of FIG. 3 in hardware (rather than software or firmware). Platform software comprising an operating system 504 or any other suitable platform software is provided at the computing-based device to enable application software 506 to be executed on the device. The application software may comprise a messaging application, a content authoring application, an information retrieval application or others where data is to be input by the user. The computing-based device 500 has a dynamic model 520, a first language model 526, a second language model 524, and optionally a virtual keyboard 522.

The computer executable instructions are provided using any computer-readable media that is accessible by computing based device 500. Computer-readable media includes, for example, computer storage media such as memory 508 and communications media. Computer storage media, such as memory 508, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 508) is shown within the computing-based device 500 it will be appreciated that the storage is, in some examples, distributed or located remotely and accessed via a network or other communication link (e.g. using communication interface 510 which is a network card, transceiver or other communication interface).

The computing-based device 500 also comprises an input/output controller 512 arranged to output display information to a display device 514 which may be separate from or integral to the computing-based device 500. The display information provides a virtual keyboard and optionally other graphical user interfaces. The input/output controller 512 is also arranged to receive and process input from one or more devices, such as a user input device 516 (e.g. a mouse, keyboard, camera, microphone or other sensor). In some examples the user input device 516 detects voice input, user gestures or other user actions and provides a natural user interface (NUI). This user input may be used to type text into the virtual keyboard 522, select predicted candidate data items for entry, give speech commands which select candidate text items for data entry and for other purposes. In an embodiment the display device 514 also acts as the user input device 516 if it is a touch sensitive display device. The input/output controller 512 outputs data to devices other than the display device in some examples, e.g. a locally connected printing device.

Any of the input/output controller 512, display device 514 and the user input device 516 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A data input system comprising:
a memory storing one or more context text items in a sequence of text items input by a user;
a plurality of language models, each language model configured to predict a next item in the sequence of text items;
a dynamic model which is bespoke to the user as a result of learning text items which the user has previously used, the dynamic model configured to predict a next item in the sequence of text items;
a plurality of per term weights stored in association with the dynamic model, each per term weight representing a likelihood of an associated term of the dynamic model given one of the language models; and
a processor which weights the predicted next item from the dynamic model using at least the per term weights.

In this way the data input system is better able to take into account the linguistic context when it makes predictions using multiple language models. As a result better predictions are made.

The data input system described above wherein the processor is configured to select one or more of the predicted next items to be offered as a candidate for data input, by taking into account the per term weights. This helps reduce burden on the user of data input to an electronic device.

The data input system described above wherein the processor computes context weights from at least the context text items and the language models, and weights the predicted next items using the context weights. For example, the context weights are computed at run time which enables accurate performance since the context weights are up to date.

The data input system described above wherein the processor computes the context weights using language model indicator metadata. Using this source of data improves accuracy of the context weights.

The data input system described above wherein the processor computes the context weights at run time of the data input system.

The data input system described above wherein the processor computes the context weights from the context text items and the dynamic model. By using the dynamic model as well the context weights are more accurate.

The data input system described above wherein, in the case that one of the predicted next items is used for data input, the processor updates per term weights of the selected predicted next item by interpolation towards the context weights. This enables learning so that improved performance happens over time.

The data input system described above wherein the processor updates the per term weights by representing the per term weights as a probability of a term given a language model, and the context weights as a probability of the context text items given a language model, and using a probabilistic update rule. This is a systematic way of updating which enables efficient and appropriate learning.

The data input system described above wherein the processor updates the per term weights by representing a per term weight as a vector in a vector space and representing a context weight as a vector in the vector space and interpolating the per term weight vector towards the context weight vector. This is a systematic way of updating which enables efficient and appropriate learning.

The data input system described above wherein the dynamic model comprises at least one per term weight with an initial value, for a term newly added to the dynamic model, and where the initial value represents any of: a random likelihood of the newly added term given any of the language models, a default likelihood of the newly added term given any of the language models. These ways of initializing the per term weights are good working solutions which are efficient to implement.

The data input system described above wherein the dynamic model comprises at least one per term weight with an initial value, for a term newly added to the dynamic model, and where the initial value represents an equal likelihood of the newly added term given any of the language models. This enables the number of language models to be taken into account and gives a good working solution which is efficient to implement.

The data input system described above wherein the dynamic model comprises at least one per term weight with an initial value, for a term newly added to the dynamic model, and where the initial value is related to the context weights.

A data input system comprising:

a user interface which receives one or more context text items in a sequence of text items input by a user; and a processor which uses a plurality of language models to predict, from each language model, a next item in the sequence of text items;

the processor using a dynamic model which is bespoke to the user as a result of learning text items which the user has previously used, to predict a next item in the sequence of text items; and the processor weighting the predicted next item from the dynamic model using at least per term weights, each per term weight representing a likelihood of an associated term of the dynamic model given one of the language models.

The data input system described above wherein the processor is configured to compute context weights from at least the context text items, and weight the predicted next items using the context weights.

A computer-implemented method of inputting data to an electronic device comprising:

receiving, at a user interface associated with the electronic device, one or more context text items in a sequence of text items input to the electronic device by a user;

using a plurality of language models to predict, from each language model, a next item in the sequence of text items;

using, by a processor, a dynamic model which is bespoke to the user as a result of learning text items which the user has previously used, to predict a next item in the sequence of text items;

weighting the predicted next item from the dynamic model using at least per term weights, each per term weight representing a likelihood of an associated term of the dynamic model given one of the language models; and selecting one or more of the predicted next items to be offered as a candidate for data input, by taking into account the per term weights.

The method described above comprising computing context weights from at least the context text items, and weighting the predicted next items using the context weights.

The method described above comprising, in the case that one of the predicted next items is used for data input, updating per term weights of the selected predicted next item by interpolation towards the context weights.

The method described above comprising updating the per term weights by representing the per term weights as a probability of a term given a language model, and representing the context weights as a probability of the context text items given a language model, and using a probabilistic update rule.

The method described above comprising by representing a per term weight as a vector in a vector space and representing a context weight as a vector in the vector space and interpolating the per term vector towards the context weight vector.

The method described above comprising assigning least one per term weight with an initial value, where the initial value represents an equal likelihood of the newly added term given any of the language models. A data input system comprising: means for receiving one or more context text items in a sequence of text items input to the electronic device by a user;

means for using a plurality of language models to predict, from each language model, a next item in the sequence of text items;

means for using a dynamic model which is bespoke to the user as a result of learning text items which the user has previously used, to predict a next item in the sequence of text items;

means for weighting the predicted next item from the dynamic model using at least per term weights, each per term weight representing a likelihood of an associated term of the dynamic model given one of the language models; and means for selecting one or more of the predicted next items to be offered as a candidate for data input, by taking into account the per term weights.

For example, the means for receiving context text items is user interface 212 or is a communications interface 510 which receives a message comprising the context text items which has been sent by an electronic device. For example, the means for using a plurality of language models to predict is the processor 204 when encoded to compute predictions from language models 210, 208. For example, the means for using a dynamic language model to predict is the processor 204 when encoded to compute predictions from dynamic model 200. For example, the means for weighting is the processor 204 when encoded to apply the per term weights 202 to the predicted next item from the dynamic model. For example, the means for selecting is the processor 204 when encoded to take into account the per term weights.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A data input system comprising:
a memory storing one or more context text items in a sequence of text items input by a user;
a processor that is configured to:
use a plurality of language models, including a first language model corresponding to a first language, and a second language model corresponding to a second language different from the first language, each language model configured to predict a respective next item in the sequence of text items, wherein the respective next item for the first language model is in the first language and the respective next item for the second language model is in the second language;
implement a dynamic model which is bespoke to the user as a result of learning text items which the user has previously used, the dynamic model configured to predict a dynamic next item in the sequence of text items, the dynamic model based on the first language and including at least one word of the second language;
assign a plurality of per term weights stored in association with the dynamic model, each per term weight representing a likelihood of an associated term of the dynamic model given one of the language models;
weight the dynamic next item from the dynamic model using at least the per term weights; and
select the respective next item for the first language, the respective next item for the second language, or the dynamic next item to be offered as a candidate for data input, by taking into account the per term weights;
wherein the dynamic next item, being an item from the second language, is selected over the respective next item for the first language when a likelihood of the dynamic next item being used in the first language is greater than a likelihood of the dynamic next item being used in the second language.

2. The data input system of claim 1 wherein the processor is configured to select one or more of the dynamic next items to be offered as a candidate for data input, by taking into account the per term weights.

3. The data input system of claim 1 wherein the processor computes context weights from at least the context text items and the language models, and weights the dynamic next items using the context weights.

4. The data input system of claim 3 wherein the processor computes the context weights using language model indicator metadata.

5. The data input system of claim 3 wherein the processor computes the context weights at run time of the data input system.

6. The data input system of claim 3 wherein the processor computes the context weights from the context text items and the dynamic model.

7. The data input system of claim 3 wherein, in the case that one of the dynamic next items is used for data input, the processor updates per term weights of the selected dynamic next item by interpolation towards the context weights.

8. The data input system of claim 7 wherein the processor updates the per term weights by representing the per term weights as a probability of a term given a language model, and the context weights as a probability of the context text items given a language model, and using a probabilistic update rule.

9. The data input system of claim 7 wherein the processor updates the per term weights by representing a per term weight as a vector in a vector space and representing a context weight as a vector in the vector space and interpolating the per term vector towards the context weight vector.

10. The data input system of claim 1 wherein the dynamic model comprises at least one per term weight with an initial value, for a term newly added to the dynamic model, and where the initial value represents any of:
a random likelihood of the newly added term given any of the language models, or a default likelihood of the newly added term given any of the language models.

11. The data input system of claim 1 wherein the dynamic model comprises at least one per term weight with an initial value, for a term newly added to the dynamic model, and where the initial value represents an equal likelihood of the newly added term given any of the language models.

12. The data input system of claim 1 wherein the dynamic model comprises at least one per term weight with an initial value, for a term newly added to the dynamic model, and where the initial value is related to the context weights.

13. A data input system comprising:
a user interface which receives one or more context text items in a sequence of text items input by a user; and a processor which uses a plurality of language models, including a first language model corresponding to a first language, and a second language model corresponding to a second language different from the first language, to predict, from each language model, a respective next item in the sequence of text items, wherein the respective next item for the first language model is in the first language and the respective next item for the second language model is in the second language;

the processor using a dynamic model which is bespoke to the user as a result of learning text items which the user has previously used, to predict a dynamic next item in the sequence of text items, the dynamic model based on the first language and including at least one word of the second language;

the processor weighting the dynamic next item from the dynamic model using at least per term weights, each per term weight representing a likelihood of an associated term of the dynamic model to be used in a given one of the language models; and the processor selecting the respective next item for the first language, the respective next item for the second language, or the dynamic next item to be offered as a candidate for data input, by taking into account the per term weights;

wherein the dynamic next item, being an item from the second language, is selected over the respective next item for the first language when a likelihood of the dynamic next item being used in the first language is greater than a likelihood of the dynamic next item being used in the second language.

14. The data input system of claim 13 wherein the processor is configured to compute context weights from at least the context text items, and weight the dynamic next items using the context weights.

15. A computer-implemented method of inputting data to an electronic device comprising:

receiving, at a user interface associated with the electronic device, one or more context text items in a sequence of text items input to the electronic device by a user;

using a plurality of language models, including a first language model corresponding to a first language, and a second language model corresponding to a second language different from the first language, to predict, from each language model, a respective next item in the sequence of text items, wherein the respective next item for the first language model is in the first language and the respective next item for the second language model is in the second language;

using, by a processor, a dynamic model which is bespoke to the user as a result of learning text items which the user has previously used, to predict a dynamic next item in the sequence of text items, the dynamic model based on the first language and including at least one word of the second language;

weighting the dynamic next item from the dynamic model using at least per term weights, each per term weight representing a likelihood of an associated term of the dynamic model to be used in a given one of the language models; and selecting the respective next item for the first language, the respective next item for the second language, or the dynamic next item to be offered as a candidate for data input, by taking into account the per term weight;

wherein the dynamic next item, being an item from the second language, is selected over the respective next item for the first language when a likelihood of the dynamic next item being used in the first language is greater than a likelihood of the dynamic next item being used in the second language.

16. The method of claim 15 comprising computing context weights from at least the context text items, and weighting the dynamic next items using the context weights.

17. The method of claim 16 comprising, in the case that one of the dynamic next items is used for data input, updating per term weights of the selected dynamic next item by interpolation towards the context weights.

18. The method of claim 17 comprising updating the per term weights by representing the per term weights as a probability of a term given a language model, and representing the context weights as a probability of the context text items given a language model, and using a probabilistic update rule.

19. The method of claim 17 comprising by representing a per term weight as a vector in a vector space and representing a context weight as a vector in the vector space and interpolating the per term vector towards the context weight vector.

20. The method of claim 15 comprising assigning least one per term weight with an initial value, where the initial value represents an equal likelihood of the newly added term given any of the language models.

* * * * *